(12) United States Patent
Watanabe et al.

(10) Patent No.: US 7,369,461 B2
(45) Date of Patent: May 6, 2008

(54) ACOUSTIC TRANSDUCER AND UNDERWATER SOUNDING APPARATUS

(75) Inventors: Kenichi Watanabe, Nishinomiya (JP); Yasushi Nishimori, Nishinomiya (JP); Kouzo Tokuyama, Nishinomiya (JP); Koji Tokuda, Nishinomiya (JP); Ryouichi Suetoshi, Nishinomiya (JP)

(73) Assignee: Furuno Electric Company, Limited, Hyogo-Ken (JP)

( * ) Notice: Subject to any disclaimer, the term of this patent is extended or adjusted under 35 U.S.C. 154(b) by 158 days.

(21) Appl. No.: 11/338,801

(22) Filed: Jan. 25, 2006

(65) Prior Publication Data

US 2006/0164919 A1 Jul. 27, 2006

(30) Foreign Application Priority Data

Jan. 26, 2005 (JP) ............... 2005-018749

(51) Int. Cl.
*G01K 11/00* (2006.01)
(52) U.S. Cl. ...................................... 367/153
(58) Field of Classification Search ............... 367/153
See application file for complete search history.

(56) References Cited

U.S. PATENT DOCUMENTS

| | | | | |
|---|---|---|---|---|
| 4,158,189 A | * | 6/1979 | Wardle | 367/153 |
| 4,328,569 A | * | 5/1982 | Trott et al. | 367/153 |
| 6,671,229 B2 | * | 12/2003 | Schmidt | 367/153 |
| 6,711,096 B1 | * | 3/2004 | Benjamin | 367/153 |
| 7,164,621 B2 | * | 1/2007 | Okunishi et al. | 367/131 |
| 2002/0080685 A1 | * | 6/2002 | Schmidt | 367/153 |
| 2003/0117897 A1 | * | 6/2003 | Schmidt | 367/153 |
| 2005/0117755 A1 | * | 6/2005 | Okunishi et al. | 367/131 |
| 2005/0226099 A1 | * | 10/2005 | Satoh et al. | 367/99 |
| 2006/0164919 A1 | * | 7/2006 | Watanabe et al. | 367/153 |

FOREIGN PATENT DOCUMENTS

| | | | |
|---|---|---|---|
| GB | 2422744 A | * | 8/2006 |
| JP | 2000-162308 A | | 6/2000 |
| JP | 2001-343450 A | | 12/2001 |
| JP | 2003-202370 | | 7/2003 |
| JP | 2003-337171 A | | 11/2003 |

OTHER PUBLICATIONS

"Spherical Models," Dover Publications, Inc., Magnus J. Wenninger, Mineola, New York, Nov. 1999, pp. 79-124.

* cited by examiner

*Primary Examiner*—Dan Pihulic
(74) *Attorney, Agent, or Firm*—Birch, Stewart, Kolasch & Birch, LLP

(57) ABSTRACT

An acoustic transducer 1 has a first cylindrical portion 1A and a second hemispherical portion 1B on which a plurality of transducer elements 10a, 10b are arranged. The transducer elements on the cylindrical portion are arranged to have six nearest neighbors. The arrangement may be such that the six transducer elements surrounding a given element describe the vertices of a regular hexagon. The hexagons thus described may be aligned so that two of their sides are parallel to the axis of the cylinder. The elements on the hemispherical portion may be arranged so that some elements have five nearest neighbors and others have six (the neighboring elements describing, for example, the vertices of hexagons and pentagons respectively). An underwater sounding apparatus may be constructed using the transducer.

10 Claims, 7 Drawing Sheets

- 1A CYLINDRICAL PORTION
- 1B HEMISPHERICAL PORTION

ACOUSTIC TRANSDUCER AND UNDERWATER SOUNDING APPARATUS

BACKGROUND OF THE INVENTION

1. Field of the Invention

The present invention relates to an acoustic transducer and an underwater sounding apparatus for detecting underwater objects, such as fish schools, by use of ultrasonic waves.

2. Description of the Related Art

Scanning sonars are conventionally known acoustic apparatuses for obtaining information on underwater objects, such as fish schools, distributed in a wide underwater area. A scanning sonar is provided with a transducer for transmitting an acoustic sounding beam in specific directions underwater and receiving echoes returned from underwater targets. There exist various types of sonar transducers, as illustrated in FIGS. 10 to 12, for example.

FIG. 10 is a perspective view of a cylindrical transducer 50 used in a full-circle scanning sonar. The transducer 50 includes a large number of transducer elements 51 arranged in horizontal rows and vertical columns on a cylindrical side surface of the transducer 50. The full-circle scanning sonar simultaneously transmits ultrasonic waves through the transducer elements 51 to form an acoustic sounding beam having an umbrellalike beam pattern directed obliquely downward at a specific tilt angle in all directions (360°) around the transducer 50 and receives echoes returned from a specific search area by scanning through the umbrellalike beam pattern. While the full-circle scanning sonar can sound a wide area not only horizontally but also vertically by electronically varying the tilt angle of the transducer 50, the full-circle scanning sonar has a disadvantage that it is impossible to sound straight down below a ship. This is because the sounding beam formed by the transducer elements 51 arranged on only the side surface of the transducer 50 can not be directed vertically downward.

FIG. 11 is a perspective view of a generally semicylindrical transducer 60 used in a half-circle scanning sonar. The transducer 60 includes a large number of elongate transducer elements 61 arranged side by side along a longitudinal direction of the transducer 60 on a generally semicylindrical side surface thereof which is formed as if by cutting part of a cylindrical shape. The half-circle scanning sonar simultaneously transmits ultrasonic waves through the transducer elements 61 to form an acoustic sounding beam having a fanlike beam pattern covering a half-circle (180°) area and receives echoes returned from a search area by scanning through the fanlike beam pattern. Designated by the numeral 62 is a training mechanism for horizontally rotating the transducer 60 in a direction marked by "H" in FIG. 11 by means of a motor (not shown) to direct the acoustic beam in a desired horizontal direction (bearing). Designated by the numeral 63 is a tilt mechanism for turning the transducer 60 in a direction marked by "V" in FIG. 11 by means of a motor (not shown) to adjust the direction (tilt angle) of the acoustic beam in a vertical plane. While the half-circle scanning sonar can sound across a wide area including a region straight down below a ship by mechanically varying the tilt angle and bearing of the transducer 60, the half-circle scanning sonar has a disadvantage that it is impossible to adjust vertical beam angle or sub-level of the acoustic beam by weighting in a direction perpendicular to the fanlike beam pattern. This is because each of the transducer elements 61 is not vertically divided into small segments.

It would be possible to overcome the aforementioned problem if both the cylindrical transducer 50 of FIG. 10 for full-circle scanning and the semicylindrical transducer 60 of FIG. 11 for half-circle scanning are installed on the hull of a ship. This approach is however impracticable from a viewpoint of cost and installation space, especially on a small ship. A scanning sonar employing a spherical transducer offering both full-circle and half-circle scanning features is made available for practical use today. For example, later-described Japanese Patent Application Publication Nos. 2000-162308 and 2001-343450 disclose examples of spherical transducers.

FIG. 12 is a perspective view of a spherical transducer 70 used in a scanning sonar. The transducer 70 includes a large number of elongate transducer elements 71 arranged on a spherical surface of the transducer 70. The scanning sonar transmits ultrasonic waves through the individual transducer elements 71 in specific directions and receives echoes by scanning through a search area. Since the transducer elements 71 are arranged on side and bottom areas of a spherical body of the transducer 70, the scanning sonar can sound across a wide area including a region straight down below a ship by using the single transducer 70 with a weight control capability. The transducer elements 71 of the spherical transducer 70 are not vertically arranged in straight lines like the cylindrical transducer 50 of FIG. 10, and directions in which radiating faces of the transducer elements 71 are oriented go further away from a horizontal plane toward the top and bottom of the spherical body of the transducer 70. For this reason, the spherical transducer 70 has a disadvantage that the intensity of a horizontal beam is rather low so that a large detection range is not achieved in horizontal directions and resolution in a vertical direction is relatively low.

One approach to aforementioned problems of the prior art would be to configure a transducer as a combination of a cylindrical portion and a hemispherical portion. Japanese Patent Application Publication No. 2001-343450 includes mention of a transducer having an upper cylindrical portion and a lower hemispherical portion. Taking advantage of the cylindrical transducer 50 of FIG. 10 and the spherical transducer 70 of FIG. 12, the transducer of this prior art Publication can sound a wide underwater area including a region straight down below a ship without sacrificing horizontal detection range or resolution in the vertical direction.

Manufacture of this kind of transducer having an upper cylindrical portion and a lower hemispherical portion requires some consideration of the arrangement of transducer elements. For example, it is necessary to minimize element-to-element interval in the vertical direction in order to suppress grating lobes which develop in the vertical direction during horizontal scanning. It is also necessary to give continuity to the transducer element arrangement on the upper cylindrical portion and the lower hemispherical portion in order to minimize deviation of directivity. There is no mention of such a transducer element arrangement in Japanese Patent Application Publication No. 2001-343450. On the other hand, Japanese Patent Application Publication No. 2000-162308 describes a configuration of a spherical transducer in which transducer elements are located at vertices of a regular polyhedron inscribed in a spherical surface as well as at midpoints of individual sides of each regular polygon constituting the regular polyhedron such that the transducer elements are located at substantially equal spacings from one another. According to the Publication, the transducer thus configured can minutely sound across an underwater search area in all directions at high speed with the transducer elements arranged uniformly and closely. While the Publication deals with the spherical transducer, it does not make any mention of an arrangement of transducer elements on a cylindrical portion of a transducer or continuity in the transducer element arrangement between the cylindrical and hemispherical portions. Thus, the aforementioned problems concerning the arrangement of transducer elements on the cylindrical and hemispherical portions for minimizing grating lobes and deviation of directivity still remain to be solved.

SUMMARY OF THE INVENTION

Accordingly, it is an object of the invention to provide a transducer having a cylindrical portion and a hemispherical portion, the transducer including a plurality of transducer elements arranged with special consideration to suppress grating lobes occurring in a vertical direction. It is another object of the invention to provide a transducer having a cylindrical portion and a hemispherical portion, the transducer including a plurality of transducer elements arranged with special consideration to minimize deviation of directivity by providing continuity in transducer element arrangement between the cylindrical and hemispherical portions.

According to a first principal aspect of the invention, an acoustic transducer having an upper cylindrical portion and a lower hemispherical portion extending immediately downward from the cylindrical portion includes a plurality of transducer elements arranged on the cylindrical portion and the hemispherical portion. The transducer elements on the cylindrical portion are arranged in such a way that six transducer elements adjacent to any one of the transducer elements are located at vertices of a regular hexagon and two sides of each of the regular hexagons are oriented parallel to the axial direction of said cylindrical portion.

If the transducer elements on the cylindrical portion of the transducer are arranged in this arrangement scheme, element intervals in the vertical direction can be minimized. This makes it possible to suppress grating lobes which develop in the vertical direction during horizontal scan operation. Since the transducer elements are arranged on a curved side surface of the cylindrical portion, it is not possible to arrange regular hexagons on the surface of the cylindrical portion in the strict sense. The aforementioned regular hexagons are regular hexagons which would be observed when the curved side surface of the cylindrical portion of the transducer is developed into a plane figure.

In one feature of the invention, the transducer elements on the hemispherical portion are located at vertices of spherical triangles constituting each of spherical polygons obtained by projecting regular polygons together forming one half of a regular polyhedron onto a hemispherical surface of the hemispherical portion in which the half of the regular polyhedron is inscribed, as well as at equal division points taken on individual sides of each of the spherical triangles and at the substantial centers of gravity of small spherical triangles formed at intersections of parallel arcs joining the equal division points of each side of the spherical triangles.

According to this arrangement scheme, the transducer elements can be arranged at substantially equal spacings from one another on the hemispherical portion of the transducer with continuity in transducer element arrangement between the cylindrical portion and the hemispherical portion. Consequently, it is possible to minimize deviation of directivity caused by lack of continuity in the transducer element arrangement in areas near a boundary between the cylindrical portion and the hemispherical portion.

Preferably, the aforementioned regular polyhedron of which one half is inscribed in the hemispherical surface of the hemispherical portion is a regular dodecahedron and the aforementioned spherical polygons are spherical pentagons obtained by projecting regular pentagons together forming one half of the regular dodecahedron onto the hemispherical surface of the hemispherical portion with one face of the regular dodecahedron directed vertically downward.

By using a regular dodecahedron as the aforementioned regular polyhedron, it is possible to easily provide a transducer element arrangement design in which element intervals in the vertical direction are minimized while maintaining continuity in the transducer element arrangement between the cylindrical portion and the hemispherical portion.

According to the invention, there is provided an acoustic transducer having an upper cylindrical portion and a lower hemispherical portion extending immediately downward from said cylindrical portion, said acoustic transducer comprising a plurality of transducer elements arranged both on said cylindrical portion and said hemispherical portion, wherein the transducer elements on said cylindrical portion are arranged in such a way that six transducer elements are disposed adjacent to any one of the transducer elements, and the transducer elements on said hemispherical portion are arranged in such a way that six transducer elements are disposed adjacent to each one of some transducer elements on the hemispherical portion and five transducer elements are disposed adjacent to each one of some transducer elements on the hemispherical portion.

According to this arrangement scheme, the transducer elements can be arranged at substantially equal spacings from one another on the transducer with continuity in transducer element arrangement between the cylindrical portion and the hemispherical portion. Consequently, it is possible to minimize deviation of directivity caused by lack of continuity in the transducer element arrangement in areas near a boundary between the cylindrical portion and the hemispherical portion.

According to the invention, there is provided an acoustic transducer having an upper cylindrical portion and a lower hemispherical portion extending immediately downward from said cylindrical portion, said acoustic transducer comprising a plurality of transducer elements arranged both on said cylindrical portion and said hemispherical portion, wherein the transducer elements on said cylindrical portion are arranged in such a way that six transducer elements adjacent to any one of the transducer elements are located at vertices of a substantially regular hexagon, and the transducer elements on said hemispherical portion are arranged in such a way that transducer elements adjacent to each one of some transducer elements are disposed at vertices of a substantially regular spherical hexagon and that transducer elements adjacent to each one of some transducer elements are disposed at vertices of a substantially regular spherical pentagon.

According to this arrangement scheme, the transducer elements can be arranged at substantially equal spacings from one another on the transducer with continuity in transducer element arrangement between the cylindrical portion and the hemispherical portion. Consequently, it is possible to minimize deviation of directivity caused by lack of continuity in the transducer element arrangement in areas near a boundary between the cylindrical portion and the hemispherical portion.

According to a second principal aspect of the invention, an underwater sounding apparatus includes an acoustic transducer having a plurality of transducer elements for transmitting an acoustic sounding beam in specific directions underwater and receiving echoes returned from underwater objects, a transmission controller for generating transmit signals used for transmitting the acoustic sounding beam by driving the transducer elements, a reception controller for obtaining information on the underwater objects by processing echo signals received by the transducer elements, and a display for displaying the information on the underwater objects obtained by the reception controller, wherein the acoustic transducer employs the transducer element arrangement schemes of the aforementioned first principal aspect of the invention. In one feature of the invention, the acoustic sounding beam formed by the acoustic transducer has an umbrellalike beam pattern directed in all directions around the acoustic transducer or a fanlike beam pattern to cover a half-circle area underwater so that the underwater sounding apparatus can perform full-circle scanning or half-circle scanning, respectively.

The aforementioned underwater sounding apparatus of the invention employs the acoustic transducer made up of the upper cylindrical portion and the lower hemispherical portion. The underwater sounding apparatus thus structured can take advantage of a cylindrical transducer and a spherical transducer of the prior art, and thereby sound a wide underwater area including a region straight down below a ship without sacrificing horizontal detection range or resolution in the vertical direction. Since the transducer elements on the cylindrical portion of the transducer are arranged as described above in this underwater sounding apparatus, element intervals in the vertical direction can be minimized and grating lobes which develop in the vertical direction during horizontal scan operation can be suppressed. Additionally, since the transducer elements on the hemispherical portion of the transducer are arranged with continuity in transducer element arrangement between the cylindrical portion and the hemispherical portion as described above, it is possible to minimize deviation of beam directivity.

In the underwater sounding apparatus of the invention, the transducer elements on the cylindrical portion of the transducer are arranged at larger intervals in the horizontal direction than in the vertical direction. This transducer element arrangement can pose a problem of grating lobes which are likely to develop in the horizontal direction during horizontal scanning. To cope with this problem, it is possible to reduce the influence of the grating lobes occurring in the horizontal direction by using a technique in which the transducer transmits and receives acoustic signals at frequencies varying from one beam direction to another, for instance. To achieve this approach, the underwater sounding apparatus may be structured such that the transmission controller drives the transducer elements to transmit the acoustic sounding beam of which frequency band varies from one beam direction to another, and the reception controller selectively obtains the echo signals from specific directions by successively varying receiving frequency from one beam direction to another.

The underwater sounding apparatus of the invention may be structured such that the transducer transmits and receives acoustic signals at different frequencies in full-circle scanning and in half-circle scanning, thereby enabling the underwater sounding apparatus to simultaneously perform full-circle scanning and half-circle scanning in each successive transmit-receive cycle. In the underwater sounding apparatus thus structured, the transmission controller generates the transmit signals at two different frequencies f1, f2 and drives the transducer elements by the transmit signals of the frequency f1 in full-circle scanning and by the transmit signals of the frequency f2 in half-circle scanning, and the reception controller extracts frequency components corresponding to the respective frequencies f1, f2 as the echo signals.

It will be appreciated from the foregoing and the following detailed description that the invention provides an acoustic transducer and an underwater sounding apparatus which can sound a wide underwater area including a region straight down below a ship without sacrificing horizontal detection range or resolution in the vertical direction. Allowing a cost reduction and space savings, the underwater sounding apparatus employing the acoustic transducer of the invention can be installed even on a small ship. Also, the transducer elements on the cylindrical portion of the transducer are arranged with special consideration to suppress grating lobes occurring in the vertical direction during horizontal scanning by minimizing element intervals in the vertical direction. Additionally, the transducer elements on the hemispherical portion are arranged with special consideration to minimize deviation of directivity by providing continuity in transducer element arrangement between the cylindrical and hemispherical portions.

These and other objects, features and advantages of the invention will become more apparent from the following detailed description when read in conjunction with the accompanying drawings.

DETAILED DESCRIPTION OF THE PREFERRED EMBODIMENT OF THE INVENTION

Figure 1:
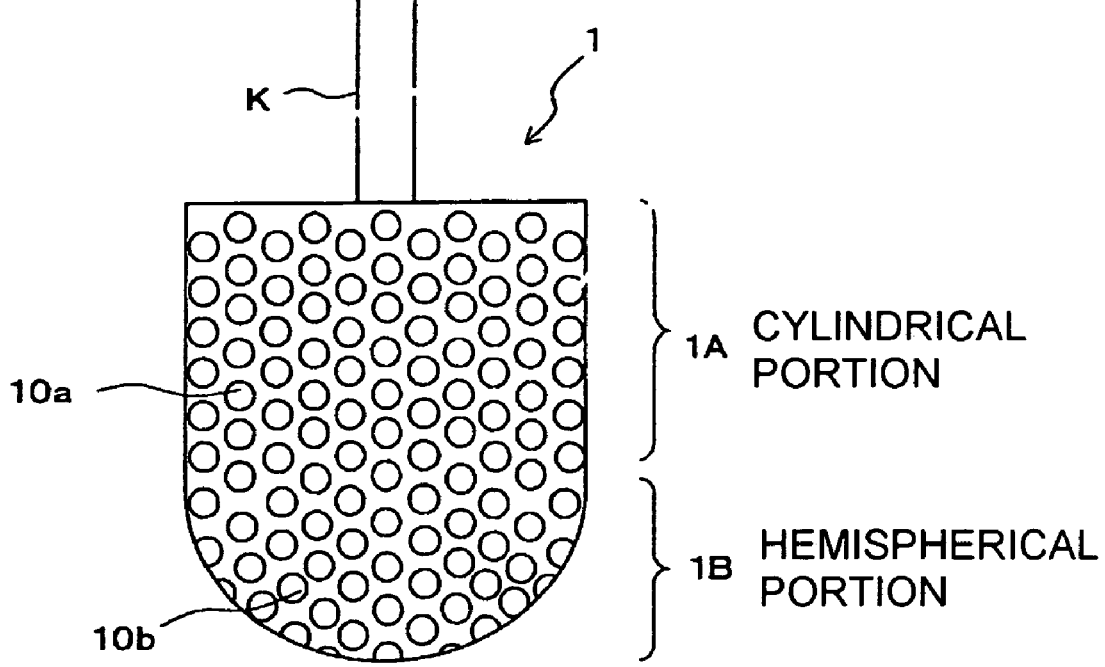
FIG. 1 is a front view of a transducer according to a preferred embodiment of the invention.

FIG. 1 is a front view of a transducer 1 according to a preferred embodiment of the invention. The transducer 1 is having an upper cylindrical portion 1A and a lower hemispherical portion 1B extending immediately downward from the cylindrical portion 1A. Designated by the letter K is a cable for transferring signals to and from a large number of transducer elements 10a, 10b which are arranged on the cylindrical portion 1A and the hemispherical portion 1B, respectively, according to later-described arrangement methods. Each of the transducer elements 10a, 10b is a vibrating element having a circular radiating face.

Figure 2:
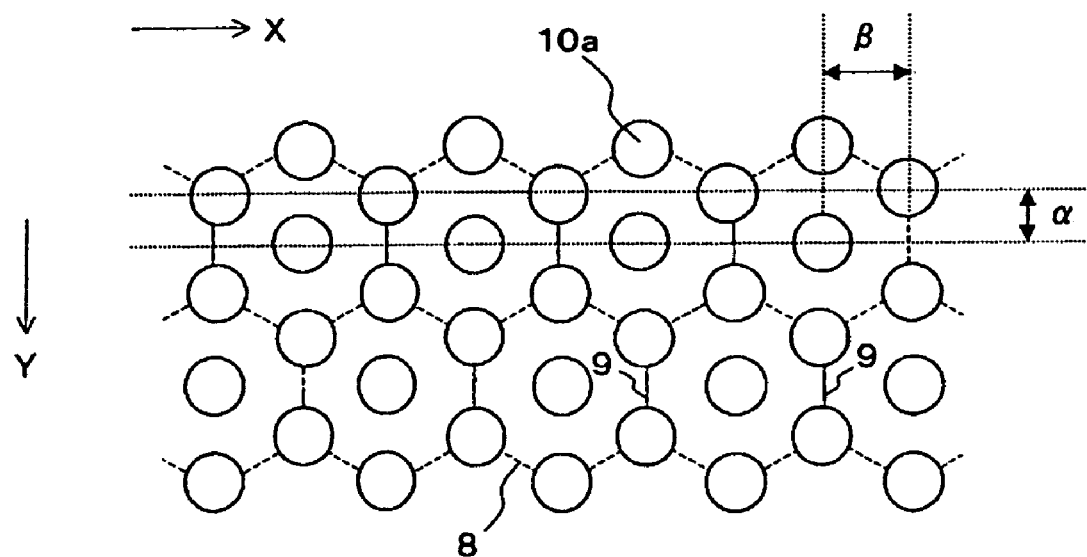
FIG. 2 is a diagram showing how transducer elements are arranged on an upper cylindrical portion of the transducer.

FIG. 2 is a view of a developed surface of the cylindrical portion 1A of the transducer 1 illustrating a method of arranging the transducer elements 10a on the cylindrical portion 1A of the transducer 1. As shown in FIG. 2, the transducer elements 10a are arranged in such a way that six transducer elements 10a adjacent to any one of the transducer elements 10a are located at vertices of a regular hexagon 8 and regular hexagons 8 adjoining in a horizontal direction (X direction) have sides 9 which are oriented parallel to a vertical, or axial, direction (Y direction) of the cylindrical portion 1A. Indicated by $\alpha$ in FIG. 2 is an interval of the transducer elements 10a in the vertical direction (Y direction) and indicated by $\beta$ is an interval of the transducer elements 10a in the horizontal direction (X direction), where there is a relationship expressed by $\alpha<\beta$. The intervals in both the vertical and horizontal directions $\alpha$, $\beta$ are made smaller than the wavelength of ultrasonic waves emitted from the transducer elements 10a in order to suppress grating lobes which develop in directions at right angles to a main lobe. If the transducer elements 10a are arranged on the cylindrical portion 1A according to such an arrangement scheme, the interval $\alpha$ in the vertical direction is minimized and the transducer elements 10a can be arranged close to one another on a curved surface of the cylindrical portion 1A at substantially equal spacings.

Figure 3:
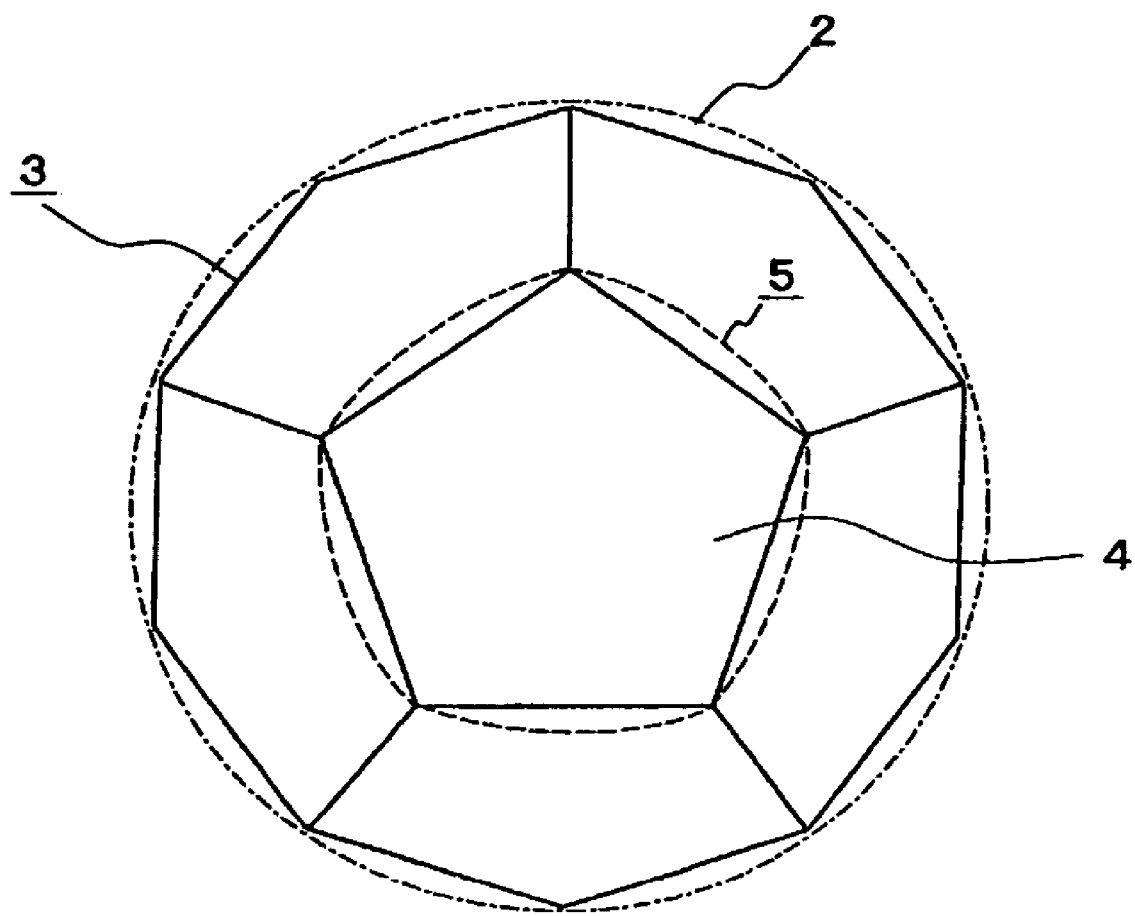
FIG. 3 is a diagram showing a regular dodecahedron inscribed in a spherical surface formed if two cylindrical portions are joined.

FIGS. 3, 4A, 4B, 4C and 5 are diagrams illustrating a method of arranging the transducer elements 10b on the hemispherical portion 1B of the transducer 1. Referring to FIG. 3, designated by the numeral 2 is a spherical surface formed if two hemispherical portions 1B are joined, designated by the numeral 3 is a regular dodecahedron which is inscribed in this spherical surface 2, and designated by the numeral 4 is one of regular pentagons forming individual faces of the regular dodecahedron 3. FIG. 3 is a top view in which the regular dodecahedron 3 is positioned such that one face of the regular dodecahedron 3 is directed vertically downward (in a direction perpendicular to the plane of the page of FIG. 3). Designated by the numeral 5 is one of spherical pentagons formed by projecting the regular pentagons 4 constituting the regular dodecahedron 3 onto the spherical surface 2. The transducer elements 10b are arranged on the hemispherical portion 1B according to an arrangement scheme defined by using the spherical pentagons 5 thus obtained. This arrangement scheme is explained below.

Figure 4A:
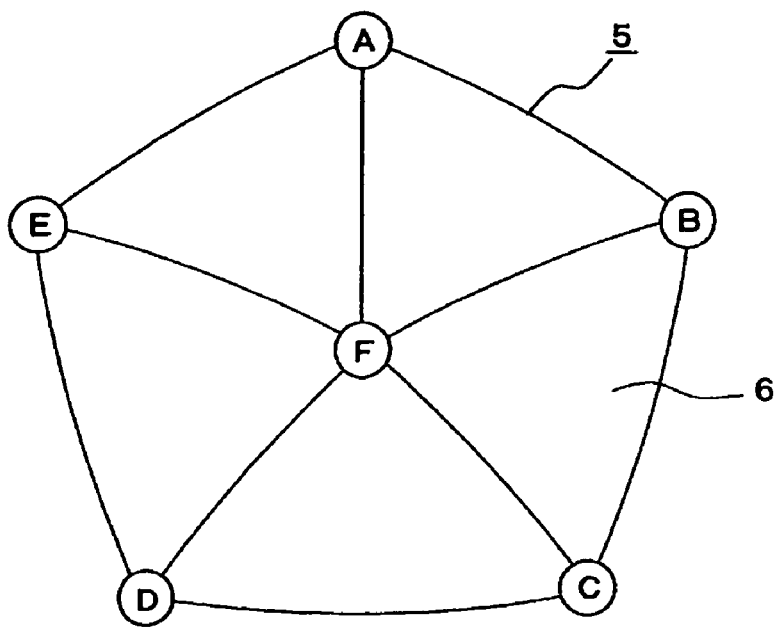
FIGS. 4A, 4B and 4C are diagrams showing how transducer elements are arranged on a lower hemispherical portion of the transducer.
Figure 4B:
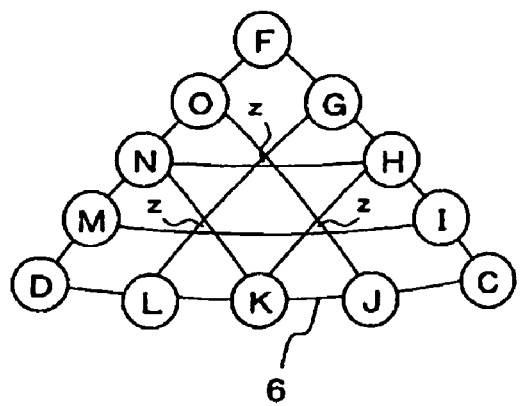
Figure 4C:
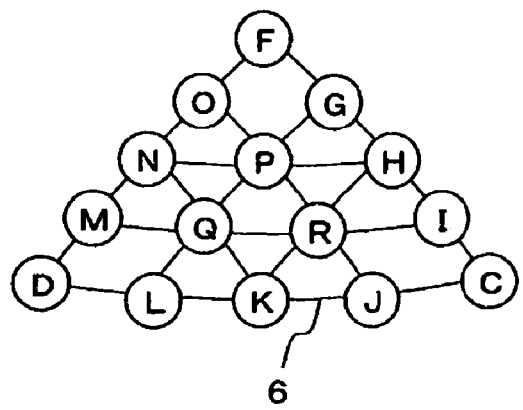
Figure 5:
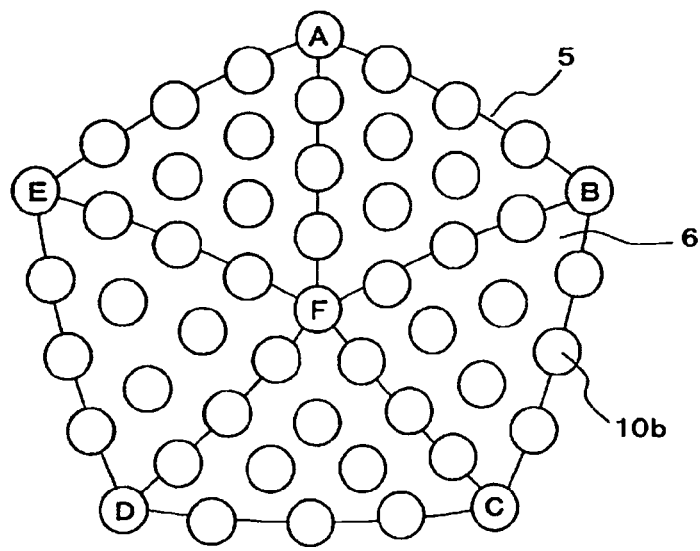
FIG. 5 is a diagram showing how the transducer elements are arranged on the lower hemispherical portion of the transducer.

Referring to FIG. 4A, designated by the letters A to E are vertices of one of the spherical pentagons 5 and designated by the letter F is the center of gravity of the spherical pentagon 5. Each spherical pentagon 5 is made up of five spherical triangles 6 ($\Delta$FAB, $\Delta$FBC, $\Delta$FCD, $\Delta$FDE, $\Delta$FEA). These spherical triangles 6 are more exactly spherical isosceles triangles. Needless to say, the spherical pentagons 5 and the spherical triangles 6 are not plane figures but are curved figures obtained by projecting the regular dodecahedron 3 onto the spherical surface 2. When arranging the transducer elements 10b on the hemispherical portion 1B, six transducer elements 10b are first arranged at the vertices A to E and the center of gravity F of each spherical pentagon 5 as shown in FIG. 4A. Next, the transducer elements 10b are arranged at points G to I, J to L and M to O at which individual sides (arcs) of each spherical triangle 6 ($\Delta$FCD as illustrated) are divided into four equal segments as shown in FIG. 4B. It is to be noted that the number of equal segments obtained by dividing each side of the spherical triangle 6 is not limited to four. Each side of the spherical triangle 6 may be divided into a desired number of equal segments. If the aforementioned equal division points G to O taken on the individual sides of each spherical triangle 6 are joined by parallel line segments (arcs) as depicted in FIG. 4B, there are formed three small spherical triangles z by these line segments. Three transducer elements 10b are arranged at the centers of gravity P, Q, R of the spherical triangles z as shown in FIG. 4C. The transducer elements 10b are arranged in all the spherical triangles 6 constituting each spherical triangle 6 by the aforementioned procedure discussed with reference to FIGS. 4A, 4B and 4C. Consequently, the transducer elements 10b are arranged as illustrated in FIG. 5 in each spherical triangle 6, whereby the transducer elements 10b are located at substantially equal spacings from one another on the hemispherical portion 1B.

The aforementioned method of arranging elements is referred to as a window centroid method, in which the elements are located at vertices and the center of gravity of each spherical polygon obtained by projecting regular polygons forming individual faces of a regular polyhedron, as well as at equal division points taken on individual sides of spherical triangles constituting each spherical polygon and at the centers of gravity of small spherical triangles formed at intersections of parallel line segments (arcs) joining the equal division points. The window centroid method is explained in detail in "Spherical Models," Dover Publications, Inc., Magnus J. Wenninger, Mineola, N.Y. (November 1999), pp 79-124.

As illustrated in FIGS. 3, 4A, 4B, 4C and 5, the above-described procedure for arranging the transducer elements 10b uses the regular dodecahedron 3 as a basis for defining the arrangement scheme. As shown in FIG. 4A, each of the spherical pentagons 5 corresponding to the individual faces of the regular dodecahedron 3 can be divided into the five spherical triangles 6. Accordingly, the aforementioned arrangement scheme gives the same result as an arrangement scheme defined based on a hexecontahedron (a polyhedron with 60 faces) formed of 60 (=5×12) spherical isosceles triangles in combination with the procedure for arranging the transducer elements 10b shown in FIGS. 4B and 4C. More specifically, when the hexecontahedron is used as a basis for defining the arrangement scheme, the transducer elements 10b are located at vertices of the spherical triangles 6, as well as at the equal division points taken on the individual sides of each spherical triangle 6 and at the centers of gravity of the small spherical triangles z formed at intersections of parallel line segments (arcs) joining the equal division points.

It is recognized from above that a regular icosahedron formed of twenty equilateral triangles may be used instead of the regular dodecahedron 3 as a basis for defining a transducer element arrangement scheme in combination with the procedure for arranging the transducer elements 10b shown in FIGS. 4B and 4C. When using a regular icosahedron as a basis for defining the arrangement scheme, however, it is necessary to direct one vertex of the regular icosahedron vertically downward in order to give continuity to transducer element arrangement between the cylindrical portion 1A and the hemispherical portion 1B of the transducer 1. For this reason, intervals of the transducer elements 10b in the vertical direction are larger than intervals of the transducer elements 10b in the horizontal direction in the arrangement scheme based on the regular icosahedron. This relationship between the element intervals in the vertical and horizontal directions in the transducer element arrangement scheme defined based on the regular icosahedron is contrary to the relationship between the element intervals in the vertical and horizontal directions in the transducer element arrangement scheme defined based on the regular dodecahedron 3. It is therefore preferable to use the transducer element arrangement scheme defined based on the regular dodecahedron 3 for the purpose of minimizing the element intervals in the vertical direction.

Figure 6:
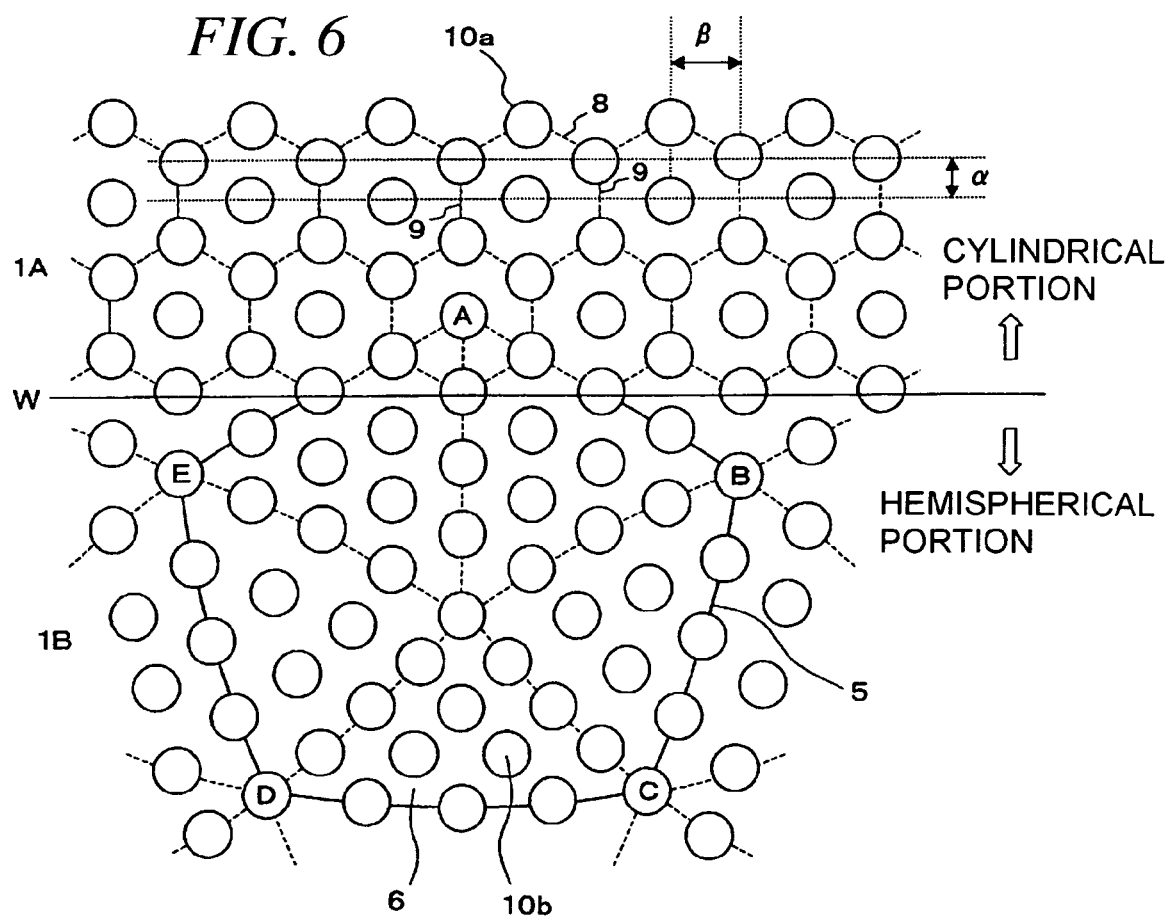
FIG. 6 is a diagram showing how the transducer elements are arranged on the upper cylindrical portion and the lower hemispherical portion of the transducer.

FIG. 6 is a diagram showing how the transducer elements 10a and the transducer elements 10b are arranged on the cylindrical portion 1A and the hemispherical portion 1B of the transducer 1, respectively, according to the above-described transducer element arrangement schemes. The transducer elements 10a on the cylindrical portion 1A are arranged in such a way that six transducer elements 10a adjacent to any one transducer element 10a are located at the individual vertices of the regular hexagon 8 surrounding that transducer element 10a and the regular hexagons 8 adjoining in the horizontal direction have the sides 9 which are oriented parallel to the vertical direction as mentioned earlier. With this transducer element arrangement scheme, the element interval $\alpha$ in the vertical direction is minimized and this makes it possible to suppress grating lobes which develop in the vertical direction during horizontal scan operation. On the other hand, the transducer elements 10b arranged on the hemispherical portion 1B are located at the vertices of the spherical triangles 6, as well as at the equal division points taken on the individual sides of each spherical triangle 6 and at the centers of gravity of the small spherical triangles z formed at intersections of parallel line segments (arcs) joining the equal division points as described above.

Referring to FIG. 6, the letter A is located at a position corresponding to the center of one lowermost regular hexagon 8 on the cylindrical portion 1A. Strictly speaking, the position of the letter A does not perfectly coincides with the uppermost vertex of one spherical pentagon 5 on the hemispherical portion 1B. It is however possible to arrange the transducer elements 10a, 10b such that the centers of the lowermost regular hexagons 8 substantially coincide with the uppermost vertices of the spherical pentagons 5 according to the above-described transducer element arrangement schemes of the present embodiment.

As can be seen from FIG. 6, it is possible to arrange the transducer elements 10a, 10b with continuity between the cylindrical portion 1A and the hemispherical portion 1B and with reduced variations in element density in areas near a boundary W between the cylindrical portion 1A and the hemispherical portion 1B according to the transducer element arrangement schemes of the embodiment. Consequently, even when an acoustic beam is transmitted and received by an acoustic aperture straddling the boundary W between the cylindrical portion 1A and the hemispherical portion 1B, it is possible to minimize deviation of directivity (fluctuation in signal level) caused by lack of continuity in the transducer element arrangement and obtain desirable directional characteristics.

When a scanning sonar employing the above-described transducer 1 transmits ultrasonic waves, the scanning sonar forms an acoustic sounding beam having an umbrellalike beam pattern for full-circle scanning or an acoustic sounding beam having a fanlike beam pattern for half-circle scanning by a pulse duration modulation (PDM) method or a pulse width modulation (PWM) method which makes it possible to control transmit signals fed into all channels independently of one another. When receiving echoes, the scanning sonar performs multi-beam-forming operation by controlling weights and phases of echo signals received by transducer elements 10 which form an acoustic aperture in each beam direction independently for the individual channels.

Figure 7:
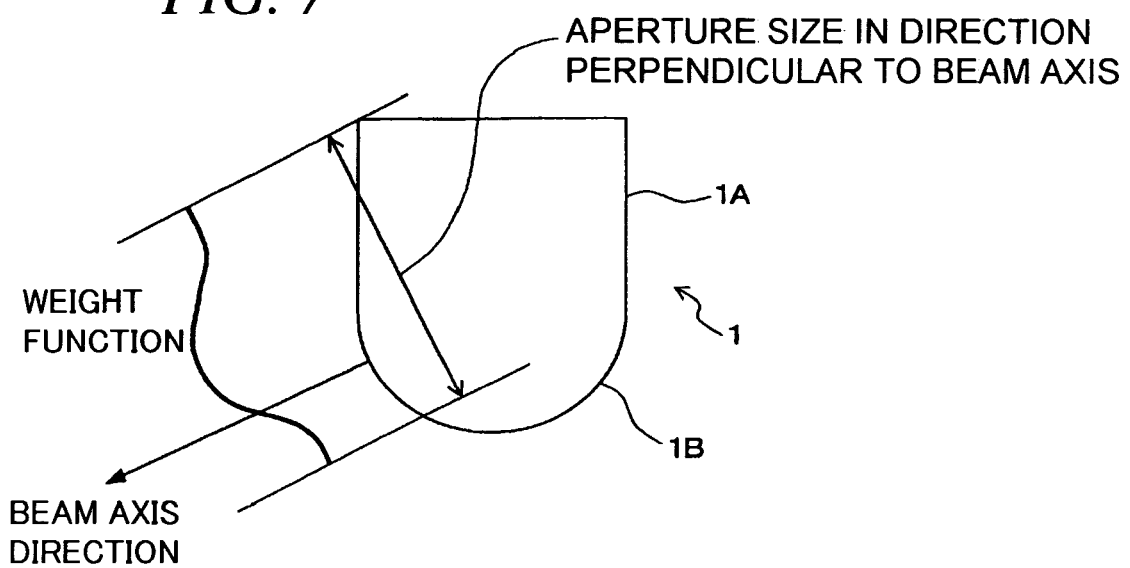
FIG. 7 is a diagram showing an example of how to lower side lobe level.

In the transducer 1 of FIG. 1 having the cylindrical portion 1A and the hemispherical portion 1B, the transducer elements 10b are arranged on the hemispherical portion 1B at a lower part of the transducer 1. For this reason, there arises a problem that the transducer 1 may pick up high-level bottom echoes due to a side lobe directed straight down toward the sea bottom, creating a false image of the sea bottom on-screen, depending on the tilt angle of the acoustic sounding beam. This problem can occur in both full-circle scanning and half-circle scanning. The level of the bottom echoes caused by the side lobe directed straight down can be lowered by decreasing acoustic aperture size as measured in a direction perpendicular to a beam axis direction in a vertical plane containing the beam axis direction for both transmission and reception or by adjusting weights assigned to the individual channels. FIG. 7 is a diagram showing an example of how to assign weights to the individual channels by using a Gaussian function as a weight function when forming an umbrellalike acoustic sounding beam by use of an entire surface area of the cylindrical portion 1A and part of the hemispherical portion 1B.

Figure 8A:
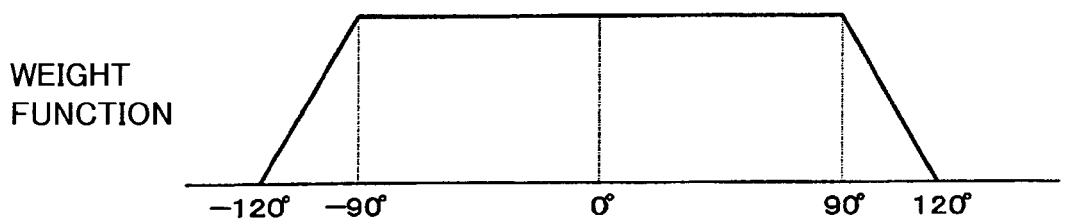
FIGS. 8A and 8B are diagrams showing a weight function and directional characteristics for half-circle scanning, respectively.
Figure 8B:
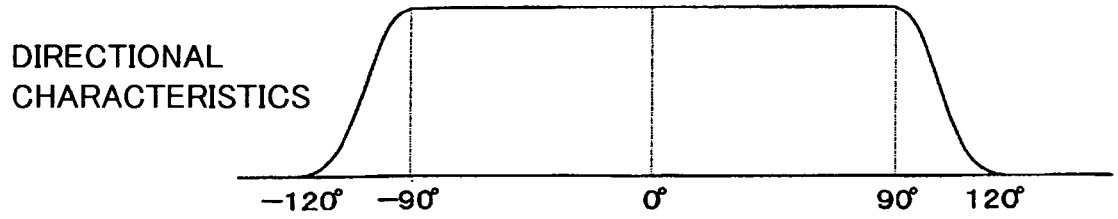

A half-circle scanning sonar employing the above-described transducer 1, for example, produces an acoustic sounding beam to cover approximately a 180° scanning area. Transmit signals fed into channels within a specific aperture area for forming the acoustic sounding beam are weighted by using a trapezoidal weight function as shown in FIG. 8A so that directional characteristics smoothly shaped as shown in FIG. 8B are obtained. Compared to a rectangular weight function, the trapezoidal weight function can reduce deviation of directivity at around extreme ends (+90° and −90° points) of the scanning area.

Figure 9:
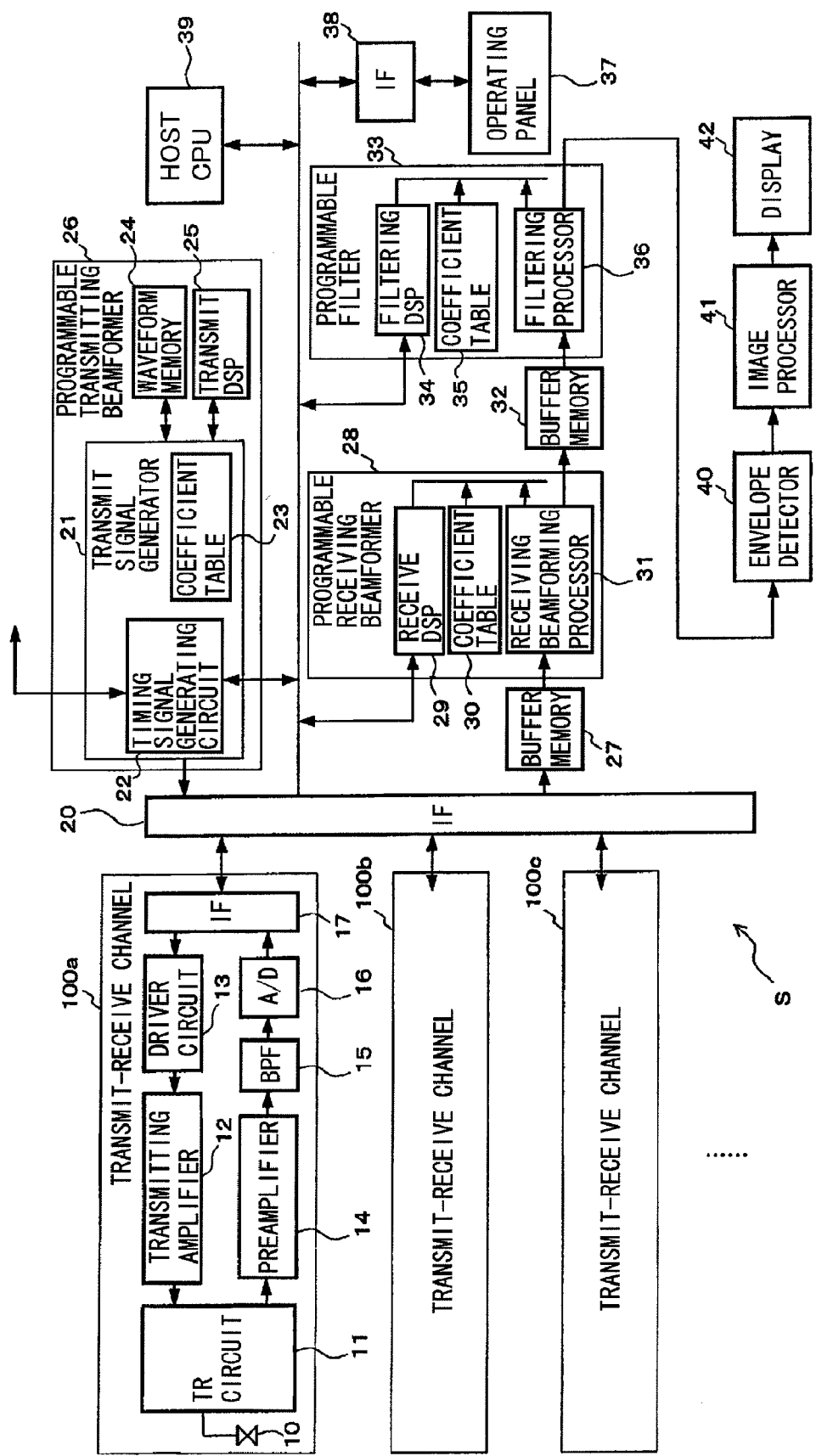
FIG. 9 is a block diagram of a scanning sonar employing the transducer of the preferred embodiment.
Figure 10:
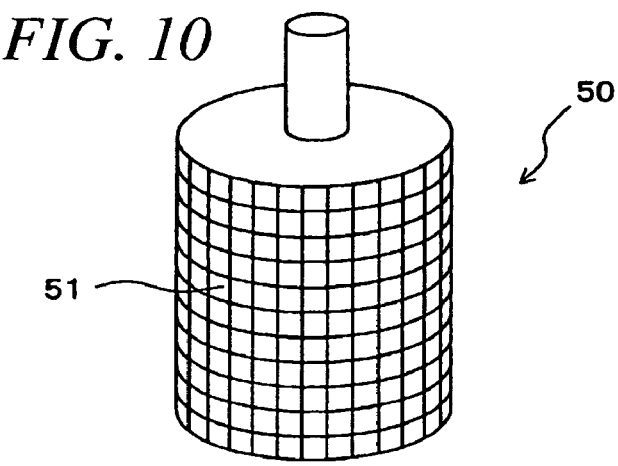
FIG. 10 is a perspective view of a conventionally known cylindrical transducer.
Figure 11:
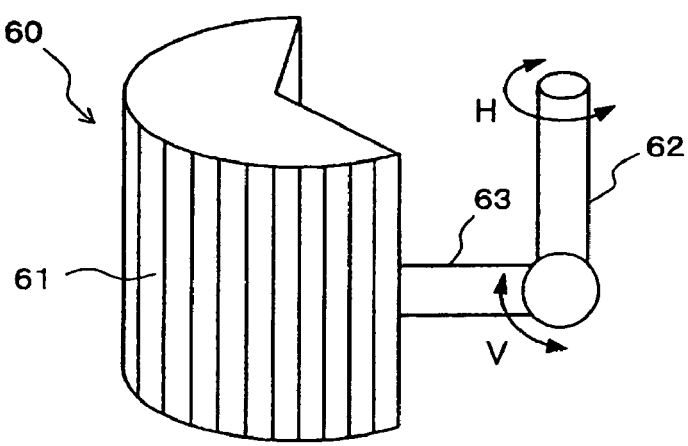
FIG. 11 is a perspective view of a conventionally known generally semicylindrical transducer.
Figure 12:
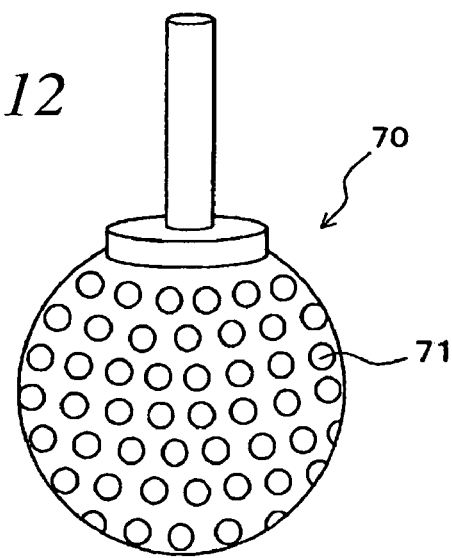
FIG. 12 is a perspective view of a conventionally known spherical transducer.

FIG. 9 is a block diagram of a scanning sonar S employing the transducer 1 of the embodiment. Designated by the numeral 10 in FIG. 9 is one of the aforementioned transducer elements (10a or 10b) which form part of respective transmit-receive channels 100 (100a, 100b, 100c, and so on). Since the individual transmit-receive channels 100 have the same circuit configuration, the following discussion gives a description of how the transmit-receive channel 100a is configured. As depicted in FIG. 9, the transmit-receive channel 100a includes a transmit-receive (TR) circuit 11 for switching the channel 100a between transmission and reception, a transmitting amplifier 12 for feeding an amplified transmit signal to the transducer element 10, a driver circuit 13 for driving the transmitting amplifier 12, a preamplifier 14 for amplifying a receive signal fed from the transducer element 10, a bandpass filter 15 which allows only such signal components of an output signal of the preamplifier 14 that fall within a specific frequency band (passband) to pass through, an analog-to-digital (A/D) converter 16 for converting the signal components which have passed through the bandpass filter 15 into a digital signal, and an interface 17 for controlling signal exchange to and from succeeding circuits.

The driver circuit 13 decodes a binary drive code fed from a later-described programmable transmitting beamformer 26 via an interface 20 and the interface 17 to produce a drive signal for driving a field effect transistor (FET) of the transmitting amplifier 12. The transmitting amplifier 12 is a full-bridge-type PDM transmitting amplifier which outputs a pulse-duration-modulated transmit signal. The transducer element 10 is driven by this transmit signal via the TR circuit 11. The TR circuit 11 passes the output signal of the transmitting amplifier 12 to the transducer element 10 during each successive transmit cycle and passes an echo signal received by the transducer element 10 to the preamplifier 14 during each successive receive cycle. The preamplifier 14 amplifies the received echo signal and the bandpass filter 15 removes noise components contained in the received echo signal existing outside the passband of the bandpass filter 15. The A/D converter 16 samples the received echo signal from which the noise components outside the passband have been removed by the bandpass filter 15 at specific sampling intervals and converts the sampled echo signal into digital echo data.

The aforementioned programmable transmitting beamformer (hereinafter referred to simply as the transmitting beamformer) 26 includes a transmit signal generator 21, a waveform memory 24 and a transmit digital signal processor (DSP) 25. The transmit signal generator 21 is made up of a field-programmable gate array (FPGA), for example, incorporating a timing signal generating circuit 22 and a coefficient table 23. The timing signal generating circuit 22 generates a reference timing signal used in generating transmit signals. The transmit DSP 25 is a digital signal processor circuit for generating the transmit signals. The transmit DSP 25 calculates binary reference drive codes for generating pulse-duration-modulated waveforms for individual angular directions with a specific kinds of different weights and writes these reference drive codes in the waveform memory 24. The transmit DSP 25 further calculates the amounts of time delays, weight values and angular directions to be introduced into the individual transmit-receive channels 100 for forming a transmitting beam and writes these parameters in the coefficient table 23. The transmit signal generator 21 generates drive codes corresponding to the weight values and the amounts of time delays of the individual channels 100 from the reference drive codes for the angular directions of the individual channels 100.

A buffer memory 27 is a memory for temporarily storing received echo data fed from the individual channels 100 through the interface 20. Designated by the numeral 28 is a programmable receiving beamformer (hereinafter referred to simply as the receiving beamformer) which includes a receive DSP 29, a coefficient table 30 and a receiving beamforming processor 31. The receiving beamforming processor 31 is made up of an FPGA. The receive DSP 29 calculates phases of echo signals received by the individual transducer elements 10 and weights to be applied to the echo signals for each direction of a receiving beam and writes these parameters in the coefficient table 30. The receiving beamforming processor 31 synthesizes the echo signals received by the individual transducer elements 10 by applying the phases and weights written in the coefficient table 30 to obtain a synthesized received echo signal. The receiving beamforming processor 31 obtains this synthesized received echo signal as time series data for each direction of the receiving beam and writes this data in a buffer memory 32.

Designated by the numeral 33 is a programmable filter which includes a filtering DSP 34, a coefficient table 35 and a filtering processor 36. The programmable filter 33 serves to perform specific band limitation and pulse compression operations for each direction of the receiving beam. The filtering DSP 34 calculates a filter coefficient for obtaining specific bandpass filter characteristics for each direction of the receiving beam and writes filter coefficients so obtained in the coefficient table 35. The filtering processor 36 performs mathematical operation as a finite impulse response (FIR) filter based on the filter coefficients stored in the coefficient table 35 and produces passband-treated echo signals. The filtering processor 36 is made up of an FPGA.

Designated by the numeral 40 is an envelope detector which detects an envelope of the passband-corrected echo signal derived from each direction of the receiving beam. Specifically, the envelope detector 40 detects the envelope by calculating the square root of the sum of the square of a real component of a time waveform and the square of an imaginary component of the time waveform.

Designated by the numeral 41 is an image processor which converts received echo signal intensities at individual distances in each direction of the receiving beam into image information and outputs the image information to a display 42. As a consequence, the display 42 presents an echo image of underwater objects, such as fish schools, detected within a specified search area.

Designated by the numeral 37 is an operating panel provided with keys. An operator enters commands for setting various parameters, such as the tilt angle of the beam, by operating appropriate keys. Each operator command entered from the operating panel 37 is sent to a host central processing unit (CPU) 39 via an interface 38, and the host CPU 39 controls individual circuit elements described above accordingly.

Although not illustrated in FIG. 9, the scanning sonar S is equipped with a motion sensor for sensing pitch and roll motion of a ship on which the scanning sonar S is installed. The transmit DSP 25 calculates coefficients to be written in the coefficient table 23 based on an output from the motion sensor such that the transmitting beam is always formed in a specified direction regardless of the motion of the ship. Likewise, the receive DSP 29 calculates coefficients to be written in the coefficient table 30 based on the output from the motion sensor such that the receiving beam is always formed in the specified direction regardless of the motion of the ship.

In the scanning sonar S of the present embodiment, the interval $\beta$ of the transducer elements 10a in the horizontal direction is larger than the interval $\alpha$ in the vertical direction on the cylindrical portion 1A of the transducer 1 as mentioned earlier. This transducer element arrangement of the embodiment may pose a problem of grating lobes which are likely to develop in the horizontal direction during horizontal scanning. An effective approach to this problem is to use a directional frequency-shift transmit-receive method, in which a transducer transmits and receives acoustic signals at frequencies varying from one beam direction to another as described in Japanese Patent Application Publication No. 2003-337171.

When the directional frequency-shift transmit-receive method is employed in the aforementioned scanning sonar S, a transmission controller including the transmitting beamformer 26, the driver circuit 13 and the transmitting amplifier 12 generates transmit signals having frequency bands directionally varying for the successive transmit-receive channels 100. Driven by these transmit signals, the individual transducer elements 10 of the transducer 1 form an acoustic sounding beam in which acoustic signals have frequencies varying from one beam direction to another. When receiving echoes, a reception controller including the receiving beamformer 28 and the programmable filter 33 selectively obtains echo signals from specific directions by successively varying receiving frequency from one beam direction to another. The scanning sonar S employing the directional frequency-shift transmit-receive method transmits acoustic signals at frequencies varying from one direction to another and selectively receives echo signals at the same frequencies as transmitted in the individual directions. This approach makes it possible to receive the echo signal from each direction with minimal influence of the echo signals from the other directions and thereby suppress grating lobes occurring in the horizontal direction by approximately 20 dB.

The present invention is not limited to the aforementioned preferred embodiment but is applicable to other types of scanning sonars. For example, the scanning sonar S of the foregoing embodiment may be modified such that the transducer 1 transmits and receives acoustic signals at different frequencies in full-circle scanning and in half-circle scanning. If different frequencies are used for full-circle scanning and half-circle scanning, it is possible to avoid mutual interference between the acoustic signals for full-circle scanning and half-circle scanning. Accordingly, the scanning sonar S can simultaneously perform full-circle scanning and half-circle scanning in each successive transmit-receive cycle, so that the scanning sonar S can efficiently search across wide areas in a short time.

In the scanning sonar S of this modified form of the embodiment, the transmitting beamformer 26 constituting part of the transmission controller generates drive codes used for producing transmit signals at two different frequencies f1, f2, and the driver circuit 13 and the transmitting amplifier 12 drive the transducer element 10 by the transmit signal of the frequency f1 in full-circle scanning while the driver circuit 13 and the transmitting amplifier 12 drive the transducer element 10 by the transmit signal of the frequency f2 in half-circle scanning. On the other hand, the programmable filter 33 constituting part of the reception controller extracts frequency components corresponding to the respective frequencies f1, f2 as received echo signals. A parallel scanning technique for simultaneously performing full-circle scanning and half-circle scanning is described in Japanese Patent Application Publication No. 2003-202370.

While the invention has thus far been described, by way of example, as being applied to an acoustic transducer of a scanning sonar, the invention is not limited thereto. For example, an acoustic transducer of the invention is applicable to various types of underwater sounding apparatuses, such as fish finders, depth sounders and current indicators.

What is claimed is:

1. An acoustic transducer having an upper cylindrical portion and a lower hemispherical portion extending immediately downward from said cylindrical portion, said acoustic transducer comprising a plurality of transducer elements arranged on said cylindrical portion and said hemispherical portion, wherein the transducer elements on said cylindrical portion are arranged in such a way that six transducer elements adjacent to any one of the transducer elements are located at vertices of a regular hexagon and two sides of each of the regular hexagons are oriented parallel to the axial direction of said cylindrical portion.

2. The acoustic transducer according to claim 1, wherein the transducer elements on said hemispherical portion are located at vertices of spherical triangles constituting each of spherical polygons obtained by projecting regular polygons together forming one half of a regular polyhedron onto a hemispherical surface of said hemispherical portion in which said half of the regular polyhedron is inscribed, as well as at equal division points taken on individual sides of each of said spherical triangles and at the substantial centers of gravity of small spherical triangles formed at intersections of parallel arcs joining the equal division points of each side of said spherical triangles.

3. The acoustic transducer according to claim 2, wherein said regular polyhedron is a regular dodecahedron and said spherical polygons are spherical pentagons obtained by projecting regular pentagons together forming one half of said regular dodecahedron onto the hemispherical surface of said hemispherical portion with one face of said regular dodecahedron directed vertically downward.

4. An acoustic transducer having an upper cylindrical portion and a lower hemispherical portion extending immediately downward from said cylindrical portion, said acoustic transducer comprising a plurality of transducer elements arranged both on said cylindrical portion and said hemispherical portion, wherein the transducer elements on said cylindrical portion are arranged in such a way that six transducer elements are disposed adjacent to any one of the transducer elements, and the transducer elements on said hemispherical portion are arranged in such a way that six transducer elements are disposed adjacent to each one of some transducer elements on the hemispherical portion and five transducer elements are disposed adjacent to each one of some transducer elements thereon.

5. An acoustic transducer having an upper cylindrical portion and a lower hemispherical portion extending immediately downward from said cylindrical portion, said acoustic transducer comprising a plurality of transducer elements arranged both on said cylindrical portion and said hemispherical portion, wherein the transducer elements on said cylindrical portion are arranged in such a way that six transducer elements adjacent to any one of the transducer elements are located at vertices of a substantially regular hexagon, and the transducer elements on said hemispherical portion are arranged in such a way that transducer elements adjacent to each one of some transducer elements are disposed at vertices of a substantially regular spherical hexagon and that transducer elements adjacent to each one of some transducer elements are disposed at vertices of a substantially regular spherical pentagon.

6. An underwater sounding apparatus comprising:
an acoustic transducer having a plurality of transducer elements for transmitting an acoustic sounding beam in specific directions underwater and receiving echoes returned from underwater objects;
a transmission controller for generating transmit signals used for transmitting the acoustic sounding beam by driving said transducer elements;
a reception controller for obtaining information on the underwater objects by processing echo signals received by said transducer elements; and
a display for displaying the information on the underwater objects obtained by said reception controller;
wherein said acoustic transducer is the acoustic transducer according to one of claims 1 to 5.

7. The underwater sounding apparatus according to claim 6, wherein the acoustic sounding beam formed by said acoustic transducer has an umbrellalike beam pattern directed in all directions around said acoustic transducer and said underwater sounding apparatus performs full-circle scanning.

8. The underwater sounding apparatus according to claim 6, wherein the acoustic sounding beam formed by said acoustic transducer has a fanlike beam pattern to cover a half-circle area underwater and said underwater sounding apparatus performs half-circle scanning.

9. The underwater sounding apparatus according to claim 6, wherein said transmission controller drives said transducer elements to transmit the acoustic sounding beam of which frequency band varies from on beam direction to another, and said reception controller selectively obtains the echo signals from specific directions by successively varying receiving frequency from one beam direction to another.

10. The underwater sounding apparatus according to claim 1, wherein said transmission controller generates the transmit signals at two different frequencies f1, f2 and drives said transducer elements by the transmit signals of the frequency f1 in full-circle scanning and by transmit signals of the frequency f2 in half-circle scanning, and said reception controller extracts frequency components corresponding to the respective frequencies f1, f2 as the echo signals.

* * * * *